(12) United States Patent
Landais et al.

(10) Patent No.: US 12,513,765 B2
(45) Date of Patent: Dec. 30, 2025

(54) RESTORATION OF MULTICAST/BROADCAST SERVICE UPON MULTICAST/BROADCAST USER PLANE FUNCTION FAILURE WITHOUT RESTART

(71) Applicant: NOKIA TECHNOLOGIES OY, Espoo (FI)

(72) Inventors: Bruno Landais, Pleumeur-Bodou (FR); Horst Thomas Belling, Erding (DE); Philippe Godin, Versailles (FR); David Navrátil, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 365 days.

(21) Appl. No.: 18/107,740

(22) Filed: Feb. 9, 2023

(65) Prior Publication Data

US 2023/0254929 A1    Aug. 10, 2023

Related U.S. Application Data

(60) Provisional application No. 63/308,400, filed on Feb. 9, 2022.

(51) Int. Cl.
*H04W 76/19* (2018.01)
*H04L 12/46* (2006.01)
*H04W 76/40* (2018.01)

(52) U.S. Cl.
CPC ......... *H04W 76/19* (2018.02); *H04L 12/4633* (2013.01); *H04W 76/40* (2018.02)

(58) Field of Classification Search
CPC .... H04W 76/16; H04W 76/40; H04L 12/4633
See application file for complete search history.

(56) References Cited

U.S. PATENT DOCUMENTS 8,279,752 B1   10/2012 Busch et al.
10,263,832 B1   4/2019 Ghosh
(Continued)

FOREIGN PATENT DOCUMENTS

EP    1835663 A2    9/2007
EP    2840736 A2    2/2015
(Continued)

OTHER PUBLICATIONS

Partial European Search Report date Jun. 23, 2023, corresponding to European Patent Application No. 23155574.9.
(Continued)

*Primary Examiner* — Kenny S Lin
(74) *Attorney, Agent, or Firm* — SQUIRE PATTON BOGGS (US) LLP (57) ABSTRACT

Systems, methods, apparatuses, and computer program products for restoration of multicast/broadcast service upon multicast/broadcast user plane function failure without restart are provided. For example, a method may include detecting non-functionality of a first multicast/broadcast user plane function that was supporting a packet forwarding control protocol session context for a multicast/broadcast session. The method may also include reselecting a second multicast/broadcast user plane function. The method may further include recreating a packet forwarding control protocol session context in the second multicast/broadcast user plane function for said multicast/broadcast session. The method may additionally include receiving new addressing information for the delivery of said multicast/broadcast session data from said second multicast/broadcast user plane function. The method may also include updating a network element with the new addressing information.

10 Claims, 7 Drawing Sheets

(56) References Cited

U.S. PATENT DOCUMENTS

| | | | |
|---|---|---|---|
| 2008/0225770 A1 | 9/2008 | Cho et al. | |
| 2013/0028099 A1 | 1/2013 | Birajdar et al. | |
| 2015/0263847 A1 | 9/2015 | Baillargeon et al. | |
| 2019/0158408 A1* | 5/2019 | Li | H04W 72/56 |
| 2020/0351984 A1* | 11/2020 | Talebi Fard | H04W 4/08 |
| 2020/0404733 A1* | 12/2020 | Hu | H04W 36/00 |
| 2021/0153080 A1* | 5/2021 | Zhu | H04W 36/0016 |
| 2023/0156091 A1* | 5/2023 | Poscic | H04L 61/50 370/254 |
| 2023/0262840 A1* | 8/2023 | Byun | H04W 76/34 455/414.1 |
| 2023/0292219 A1* | 9/2023 | Byun | H04W 40/246 |

FOREIGN PATENT DOCUMENTS

| | | | |
|---|---|---|---|
| EP | 3301997 A1 | 4/2018 | |
| EP | 4369788 A1 * | 5/2024 | H04W 4/06 |
| WO | 2008044971 A1 | 4/2008 | |

OTHER PUBLICATIONS

Extended European Search Report dated Nov. 6, 2023, corresponding to European Patent Application No. 23155574.9.

3GPP TS 29.532 V1.0.0 (Dec. 2021), Technical Specification, 3rd Generation Partnership Project; Technical Specification Group Core Network and Terminals; 5G System; 5G Multicast-Broadcast Session Management Services Stage 3 (Release 17), Dec. 2021.

3GPP TS 29.522 V17.4.0 (Dec. 2021), Technical Specification, 3rd Generation Partnership Project; Technical Specification Group Core Network and Terminals; 5G System; Network Exposure Function Northbound APIs; Stage 3 (Release 17), Dec. 2021.

3GPP TS 23.527 V17.2.0 (Dec. 2021), Technical Specification, 3rd Generation Partnership Project; Technical Specification Group Core Network and Terminals; 5G System; Restoration Procedures (Release 17), Dec. 2021.

3GPP TS 38.413 V16.8.0 (Dec. 2021), Technical Specification, 3rd Generation Partnership Project; Technical Specification Group Radio Access Network; NG-RAN; NG Application Protocol (NGAP) (Release 16), Dec. 2021.

3GPP TS 23.247 V17.1.0 (Dec. 2021), Technical Specification, 3rd Generation Partnership Project; Technical Specification Group Services and System Aspects; Architectural enhancements for 5G multicast-broadcast services; Stage 2 (Release 17), Dec. 2021.

3GPP TS 29.244 V17.3.0 (Dec. 2021), Technical Specification, 3rd Generation Partnership Project; Technical Specification Group Core Network and Terminals; Interface between the Control Plane and the User Plane Nodes; Stage 3 (Release 17), Dec. 2021.

3GPP TS 29.281 V17.1.0 (Sep. 2021), Technical Specification, 3rd Generation Partnership Project; Technical Specification Group Core Network and Terminals; General Packet Radio System (GPRS) Tunnelling Protocol User Plane (GTPv1-U) (Release 17), Sep. 2021.

3GPP TS 23.501 V17.3.0 (Dec. 2021), Technical Specification, 3rd Generation Partnership Project; Technical Specification Group Services and System Aspects; System architecture for the 5G System (5GS); Stage 2 (Release 17), Dec. 2021.

Ericsson, "Discussion on Restoration of an MBS session in 5GS," C4-220165, 3GPP TSG-CT WG4 Meeting #107-bis-e, E-Meeting, Jan. 17-21, 2022.

European Communication pursuant to Article 94(3) EPC, corresponding to EP Application No. 23 155 574.9, dated May 19, 2025.

* cited by examiner

RESTORATION OF MULTICAST/BROADCAST SERVICE UPON MULTICAST/BROADCAST USER PLANE FUNCTION FAILURE WITHOUT RESTART

CROSS REFERENCE TO RELATED APPLICATION

This application claims the benefit of U.S. Provisional Application No. 63/308,400, filed Feb. 9, 2022. The entire content of the above-referenced application is hereby incorporated by reference.

FIELD

Some example embodiments may generally relate to communications including mobile or wireless telecommunication systems, such as Long Term Evolution (LTE) or fifth generation (5G) radio access technology or new radio (NR) access technology or 5G beyond, or other communications systems. For example, certain example embodiments may generally relate to systems and/or methods for providing restoration of multicast/broadcast service upon multicast/broadcast user plane function failure without restart.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

SUMMARY

An embodiment may be directed to an apparatus. The apparatus can include at least one processor and at least one memory comprising computer program code. The at least one memory and computer program code can be configured, with the at least one processor, to cause the apparatus at least to perform detecting non-functionality of a first multicast/broadcast user plane function that was supporting a packet forwarding control protocol session context for a multicast/broadcast session. The at least one memory and computer program code can also be configured, with the at least one processor, to cause the apparatus at least to perform reselecting a second multicast/broadcast user plane function. The at least one memory and computer program code can further be configured, with the at least one processor, to cause the apparatus at least to perform recreating a packet forwarding control protocol session context in the second multicast/broadcast user plane function for said multicast/broadcast session. The at least one memory and computer program code can additionally be configured, with the at least one processor, to cause the apparatus at least to perform receiving new addressing information for the delivery of said multicast/broadcast session data from said second multicast/broadcast user plane function. The at least one memory and computer program code can also be configured, with the at least one processor, to cause the apparatus at least to perform updating a network element with the new addressing information.

An embodiment may be directed to an apparatus. The apparatus can include at least one processor and at least one memory comprising computer program code. The at least one memory and computer program code can be configured, with the at least one processor, to cause the apparatus at least to perform receiving a multicast/broadcast session context status notification for a multicast session reporting a change a low-layer source-specific multicast address change and including the updated low-layer source-specific multicast address and the common general packet radio service tunneling endpoint identifier. The at least one memory and computer program code can also be configured, with the at least one processor, to cause the apparatus at least to perform sending a request to a user plane function for the multicast session to join data delivery of the low-layer source-specific multicast address and the common general packet radio service tunneling endpoint identifier and leave the data delivery from the low-layer source-specific multicast address that was previously in use for the multicast session.

An embodiment may be directed to an apparatus. The apparatus can include at least one processor and at least one memory comprising computer program code. The at least one memory and computer program code can be configured, with the at least one processor, to cause the apparatus at least to perform receiving a multicast/broadcast session status notification request reporting an ingress tunnel address change event and including an updated ingress tunnel internet protocol address. The at least one memory and computer program code can also be configured, with the at least one processor, to cause the apparatus at least to perform redirecting the delivery of the multicast/broadcast session data to the updated ingress tunnel internet protocol address.

An embodiment may be directed to an apparatus. The apparatus can include at least one processor and at least one memory comprising computer program code. The at least one memory and computer program code can be configured, with the at least one processor, to cause the apparatus at least to perform receiving a multicast session update request for a multicast session including an updated low-layer source-specific multicast address and common general packet radio service tunneling endpoint identifier. The at least one memory and computer program code can also be configured, with the at least one processor, to cause the apparatus at least to perform joining the delivery of the multicast session data from the updated low-layer source-specific multicast address and common general packet radio service tunneling endpoint identifier, and leaving data delivery from the previous low-layer source-specific multicast address and common general packet radio service tunneling endpoint identifier that was in use for the multicast session.

An embodiment may be directed to a method. The method may include detecting non-functionality of a first multicast/broadcast user plane function that was supporting a packet forwarding control protocol session context for a multicast/broadcast session. The method may also include reselecting a second multicast/broadcast user plane function. The method may further include recreating a packet forwarding control protocol session context in the second multicast/broadcast user plane function for said multicast/broadcast session. The method may additionally include receiving new addressing information for the delivery of said multicast/broadcast session data from said second multicast/broadcast user plane function. The method may also include updating a network element with the new addressing information.

An embodiment may be directed to a method. The method may include receiving a multicast/broadcast session context status notification for a multicast session reporting a change a low-layer source-specific multicast address change and including the updated low-layer source-specific multicast address and the common general packet radio service tunneling endpoint identifier. The method may also include sending a request to a user plane function for the multicast session to join data delivery of the low-layer source-specific multicast address and the common general packet radio service tunneling endpoint identifier and leave the data delivery from the low-layer source-specific multicast address that was previously in use for the multicast session.

An embodiment may be directed to a method. The method may include receiving a multicast/broadcast session status notification request reporting an ingress tunnel address change event and including an updated ingress tunnel internet protocol address. The method may also include redirecting the delivery of the multicast/broadcast session data to the updated ingress tunnel internet protocol address.

An embodiment may be directed to a method. The method may include receiving a multicast session update request for a multicast session including an updated low-layer source-specific multicast address and common general packet radio service tunneling endpoint identifier. The method may also include joining the delivery of the multicast session data from the updated low-layer source-specific multicast address and common general packet radio service tunneling endpoint identifier, and leaving data delivery from the previous low-layer source-specific multicast address and common general packet radio service tunneling endpoint identifier that was in use for the multicast session.

An embodiment may be directed to an apparatus. The apparatus may include means for detecting non-functionality of a first multicast/broadcast user plane function that was supporting a packet forwarding control protocol session context for a multicast/broadcast session. The apparatus may also include means for reselecting a second multicast/broadcast user plane function. The apparatus may further include means for recreating a packet forwarding control protocol session context in the second multicast/broadcast user plane function for said multicast/broadcast session. The apparatus may additionally include means for receiving new addressing information for the delivery of said multicast/broadcast session data from said second multicast/broadcast user plane function. The apparatus may also include means for updating a network element with the new addressing information.

An embodiment may be directed to an apparatus. The apparatus may include means for receiving a multicast/broadcast session context status notification for a multicast session reporting a change a low-layer source-specific multicast address change and including the updated low-layer source-specific multicast address and the common general packet radio service tunneling endpoint identifier. The apparatus may also include means for sending a request to a user plane function for the multicast session to join data delivery of the low-layer source-specific multicast address and the common general packet radio service tunneling endpoint identifier and leave the data delivery from the low-layer source-specific multicast address that was previously in use for the multicast session.

An embodiment may be directed to an apparatus. The apparatus may include means for receiving a multicast/broadcast session status notification request reporting an ingress tunnel address change event and including an updated ingress tunnel internet protocol address. The apparatus may also include means for redirecting the delivery of the multicast/broadcast session data to the updated ingress tunnel internet protocol address.

An embodiment may be directed to an apparatus. The apparatus may include means for receiving a multicast session update request for a multicast session including an updated low-layer source-specific multicast address and common general packet radio service tunneling endpoint identifier. The apparatus may also include means for joining the delivery of the multicast session data from the updated low-layer source-specific multicast address and common general packet radio service tunneling endpoint identifier, and leaving data delivery from the previous low-layer source-specific multicast address and common general packet radio service tunneling endpoint identifier that was in use for the multicast session.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for providing broadcast service restoration for multicast/broadcast service (MBS) upon radio access node failure or restart, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Certain embodiments may have various aspects and features. These aspects and features may be applied alone or in any desired combination with one another. Other features, procedures, and elements may also be applied in combination with some or all of the aspects and features disclosed herein.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Figure 1:
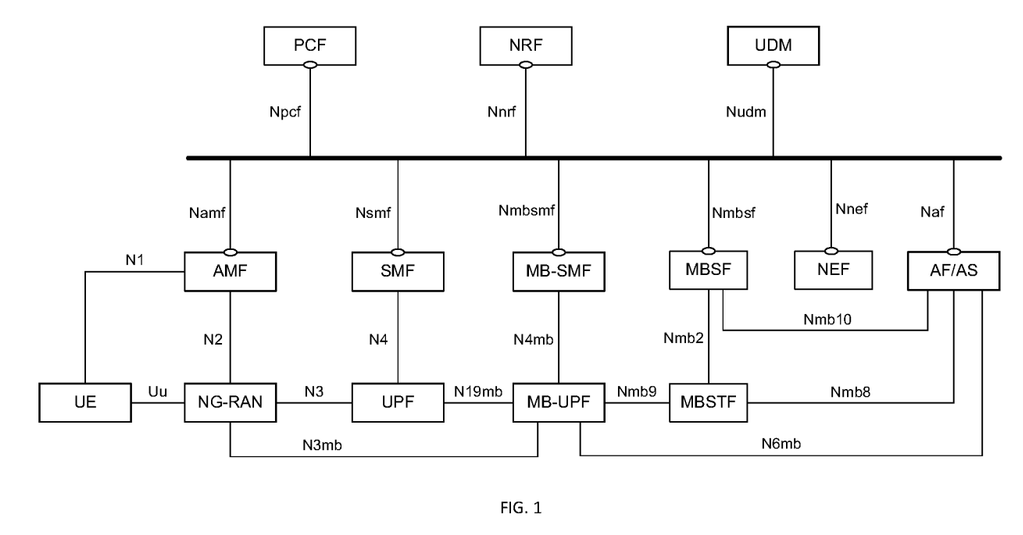
FIG. 1 illustrates a system architecture.

Release 17 (Rel-17) of the Third Generation Partnership Project (3GPP), describes architectural enhancements for fifth generation (5G) multicast and broadcast services. For example, 3GPP technical specification (TS) 23.247 describes a system architecture. FIG. 1 illustrates a system architecture. FIG. 1 is based on FIG. 5.1-1, "5G System architecture for Multicast and Broadcast Service," in 3GPP TS 23.247.

As shown in FIG. 1, N4mb and N4 are the reference points used respectively between the between the session management function (SMF) and the user plane function (UPF) and between the multicast/broadcast (MB) SMF (MB-SMF) and the MB-UPF. Packet forwarding control protocol (PFCP) can be the protocol used over N4mb and N4. PFCP is specified in 3GPP TS 29.244.

An MB services (MBS) session may correspond to a broadcast MBS session, in which case the SMF and UPF may not be involved in the delivery of the service. An MBS session may alternatively correspond to a multicast MBS session, in which case the SMF and UPF can be involved in the delivery of MBS data, as explained in more detail in 3GPP TS 23.247.

For both broadcast and multicast MBS sessions, unicast transport or multicast transport can be used on N3mb, which may be applicable to broadcast and multicast MBS sessions, and can also be used on N19mb, which may be applicable to multicast MBS sessions only. Unicast transport can send packets in a general packet radio service (GPRS) tunneling protocol (GTP) user plane (GTP-U) tunnel as described in 3GPP TS 29.281. Packets can be sent to a downlink (DL) fully qualified tunnel endpoint identifier (F-TEID), which may include an internet protocol (IP) address and a tunnel endpoint identifier (TEID). Multicast transport can send packets using a low-layer source-specific multicast (LL SSM) address and common GTP TEID (C-TEID). An LL SSM address can include a multicast address, which can be used as destination address in packets sent, and the LL SSM address can also include a source IP address, which can correspond to an IP address of the MB-UPF. 3GPP TS 29.281 includes further discussion regarding IP multicast distribution of user plane data for MBMS and MBS.

MBS service restoration can refer end to end procedures to restore an MBS session when a failure with or without restart affects any entity involved in the delivery of the MBS session. The entities that may be affected can include, for example, MB-SMF, SMF, access and mobility management function (AMF), MB-UPF, UPF, and radio access network (RAN). In FIG. 1, the RAN element shown is a next generation (NG) RAN (NG-RAN) connected to a user equipment (UE) over a Uu interface.

The MB-SMF may store identities of AMFs handling a multicast or broadcast session. The AMF may be aware of RAN nodes involved in a multicast or broadcast MBS session and may store their identities.

When a failure with or without restart affects an MB-UPF, without certain embodiments all the PFCP sessions and contexts created in the MB-UPF for MBS sessions may be lost. Moreover, without certain embodiments MBS data may be undeliverable to the end users.

Moreover, without certain embodiments, if an NG-RAN node is reconfigured with a new tracking area identifier (TAI) that is part of an MBS service area of an existing MBS session, there may be no way to start the broadcast of an existing broadcast MBS session in the RAN node.

Figure 2:
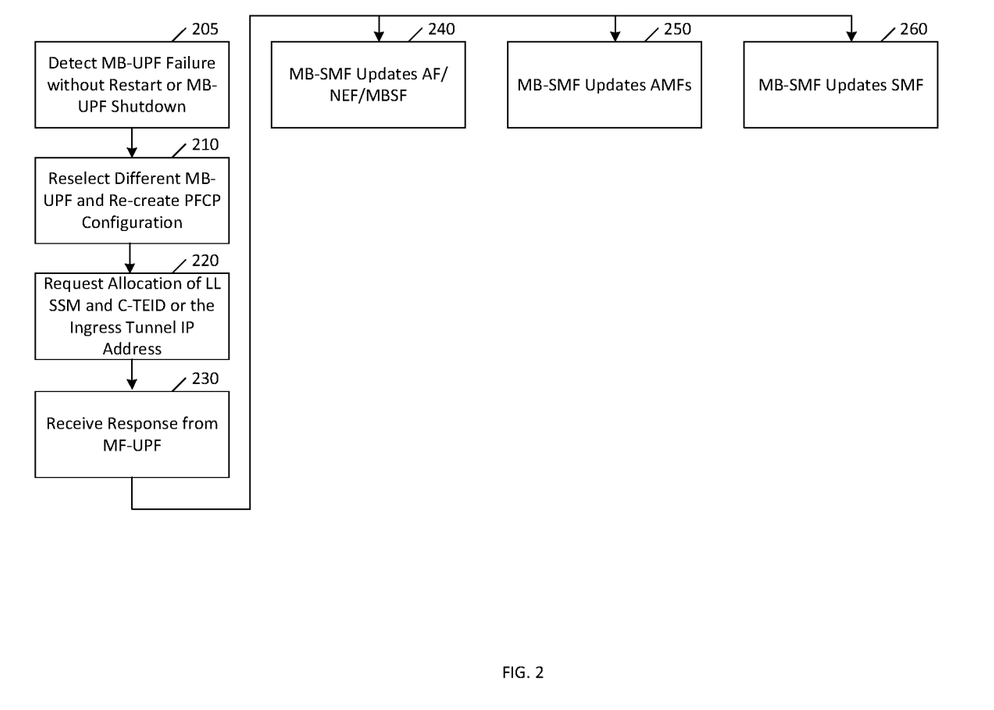
FIG. 2 illustrates a method according to certain embodiments.

FIG. 2 illustrates a method according to certain embodiments. Upon detecting an MB-UPF failure without restart (or MB-UPF shutdown) at 205, for each MBS session or location dependent component of an MBS session (identified by MBS session ID and area session ID) that was served by this MB-UPF, the MB-SMF can perform additional procedures.

At 210, the MB-SMF can reselect a different MB-UPF and can re-create the PFCP configuration for the MBS session or location dependent component of an MBS session in this MB-UPF including the GTP-U F-TEID of the current UPFs and RAN nodes involved in the delivery, if unicast transport is used is used over N3mb or N19mb towards those nodes. If multicast transport is used over N3mb and/or N19mb, at 220 the MB-SMF can request the MB-UPF to allocate an LL SSM and a C-TEID for MBS data delivery over N3mb and/or N6mb. The MB-SMF can also indicate whether unicast or multicast transport is to be used to receive the MBS data over N6mb or Nmb9. If unicast transport is used, the MB-SMF can request the MB-UPF to allocate an ingress tunnel address where the MB-UPF expects to receive the multicast/broadcast session data over N6mb/N9mb. If multicast transport is used, the MB-SMF can provide a multicast address and can instruct the MB-UPF to join delivery from that multicast address.

At 230, a response can be received from the MB-UPF. This can be a response to the MB-SMF's request to re-create PFCP configuration for the MBS session or location dependent component of the MBS session. The response can include a new ingress tunnel address to be used by the application function (AF)/network exposure function (NEF)/multicast/broadcast service function (MBSF) to send MBS data towards the MB-UPF if unicast transport is to be used over N6mb or Nmb9. The response can also include a new LL SSM address and C-TEID used by the MB-UPF to send MBS data towards RANs and/or UPFs, if multicast transport is to be used over N3mb and/or N19mb.

If the request for MBS session re-creation includes SSM address for N6mb or N9mb, the MB-UPF can join delivery from that multicast address.

At 240, if unicast transport is to be used over N6mb or Nmb9, the MB-SMF can update the AF/NEF/MBSF about the new N6mb/Nmb9 tunnel address to use for sending MBS data for that MBS session or location dependent component of the MBS session, for example by sending a new notification. The AF/MBSF can then start sending MBS data to the new N6mb/Nmb9 tunnel address (not explicitly shown in FIG. 2).

At 250, if multicast transport is used over N3mb, the MB-SMF can update the AMFs handling a multicast or broadcast MBS session or location dependent component of an MBS session about the new MB-UPF LL SSM address and C-TEID. Not explicitly shown in FIG. 2, the AMFs can forward the information from the MB-SMF towards RAN nodes handling the MBS session. This forwarding can be done using the multicast session update procedure with extended message contents for a multicast MBS session, and the MBS session update for broadcast for a broadcast MBS session.

The RAN nodes can join delivery from the new multicast transport address to receive MBS data from the new MB-UPF and leave delivery from the previous multicast address in use for this broadcast/multicast session.

For a multicast MBS session, at 260 the MB-SMF can update the SMF about the new MB-UPF LL SSM address and C-TEID, if multicast transport is used over N19mb, for example by sending a new notification. The SMF can update the UPF terminating the N19mb tunnel about the new MB-UPF LL SSM address and C-TEID.

The UPF can join delivery from the new LL SSM address to receive MBS session data from the new MB-UPF and can leave delivery from the previous LL SSM address.

The same principles can also apply to an MB-UPF failure with restart, if the MB-UPF does not support restoring the MBS session with the same N6mb and/or N3mb/N19mb LL SSL and C-TEID as were allocated before the restart. In other words, the approach described herein can support all scenarios where the addressing information for MBS data delivery cannot be preserved in the MB-UPF and new addresses need to be allocated and used in the system.

FIG. 2 is provided as one example embodiment of a method or process. However, certain embodiments are not limited to this example, and further examples are possible as discussed elsewhere herein.

Figure 3:
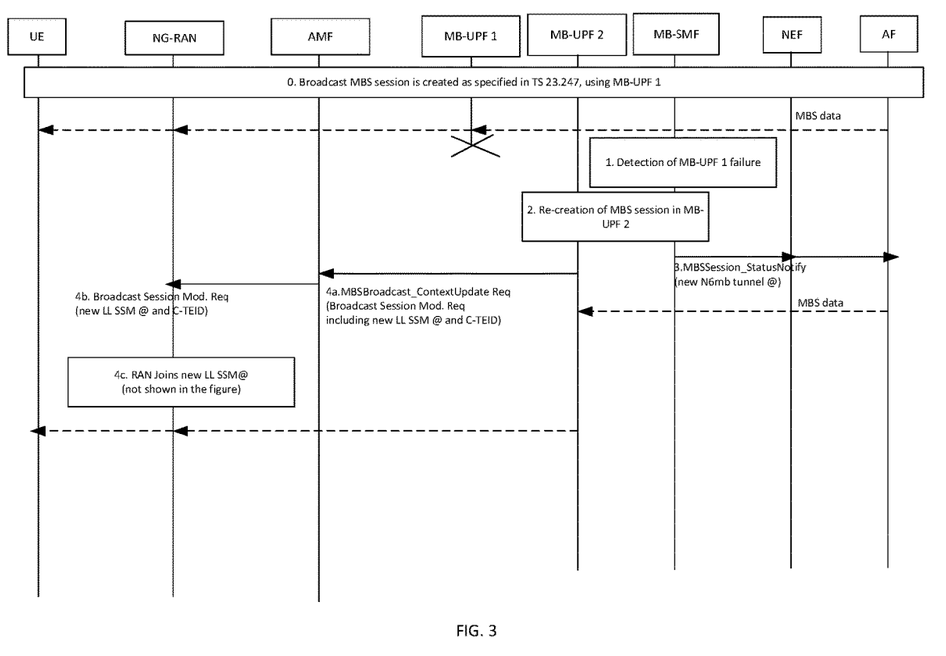
FIG. 3 illustrates a signal flow diagram associated with a method to restore a broadcast multicast/broadcast service session upon a multicast/broadcast user plane function failure without restart, according to certain embodiments.

FIG. 3 illustrates a signal flow diagram associated with a method to restore a broadcast multicast/broadcast service session upon a multicast/broadcast user plane function failure without restart, according to certain embodiments.

At 0, a broadcast MBS session can be created as specified in 3GPP TS 23.247, using MB-UPF 1. In this illustration, there are two MB-UPFs, although there could be many more than two, with two being an example.

At 1, the MB-SMF can detect MB-UPF failure without restart or MB-UPF shutdown. This detection may be based on the MB-UPF being no longer responsive and not replying to PFCP heartbeat messages. Other ways of detecting failure are also permitted.

At 2, the MB-SMF can perform re-creation of the MBS session in MB-UPF 2. The MB-SMF can reselect a different MB-UPF and can re-create the PFCP configuration for the MBS session or location dependent component of the MBS session in this MB-UPF, including the GTP-U F-TEID of the current UPFs and RAN nodes involved in the delivery, if unicast transport is used over N3mb and/or N19mb towards those nodes. If multicast transport is used over N3mb and/or N19mb, the MB-SMF can request the MB-UPF to allocate an LL SSM and a C-TEID for MBS data delivery over N3mb and/or N6mb. The MB-SMF can also indicate whether unicast or multicast transport is to be used to receive the MBS data over N6mb or Nmb9. If unicast transport is used, the MB-SMF can request the MB-UPF to allocate an (N6mb/N9mb) ingress tunnel address. If multicast transport is used, the MB-SMF can provide a multicast address and can instruct the MB-UPF to join delivery from that multicast address.

In response to the MB-SMF's request to re-create the PFCP configuration for the MBS session, the MB-UPF can return the following: a new (N6mb/N9mb) ingress tunnel address to be used by the AF/NEF/MBSF to send MBS data if unicast transport is used over N6mb; or a new LL SSM and C-TEID used by the MB-UPF to send MBS data towards RANs, if multicast transport is used over N3mb.

If the request for MBS session re-creation includes an SSM address for N6mb or N9mb, the MB-UPF can join delivery from that multicast address.

At 3, the MB-SMF can update the AF/NEF/MBSF about the new N6mb/Nmb9 tunnel address to use for sending MBS data. This update can be done by the MB-SMF sending a Nmbsmf_MBSSession_StatusNotify request with a new event type reporting a change of the N6mb address and including the new address. The NEF can forward the notification using the Nnef_MBSSession_StatusNotify request with the same information towards the AF.

The AF/MBSF can start sending MBS data to the new N6mb/Nmb9 tunnel address.

Next, the MB-SMF can update the RANs about the new MB-UPF LL SSM address and C-TEID, if multicast transport is used over N3mb, by sending at 4a an Namf_MBS-Broadcast_ContextUpdate Request to the relevant AMF nodes serving the RAN nodes. The message can encapsulate an NGAP Broadcast Session Modification Request message with an embedded MBS Session Information Modify Request Transfer IE including the new LL SMM address and C-TEID used for the delivery of the MBS data, which can be provided by the AMF at 4b.

The RAN nodes can join the new multicast transport address to receive MBS data from the new MB-UPF and leave the previous multicast address if the previous multicast address was in use for this broadcast/multicast session. The MBS session data can be broadcast on the radio interface.

Figure 4:
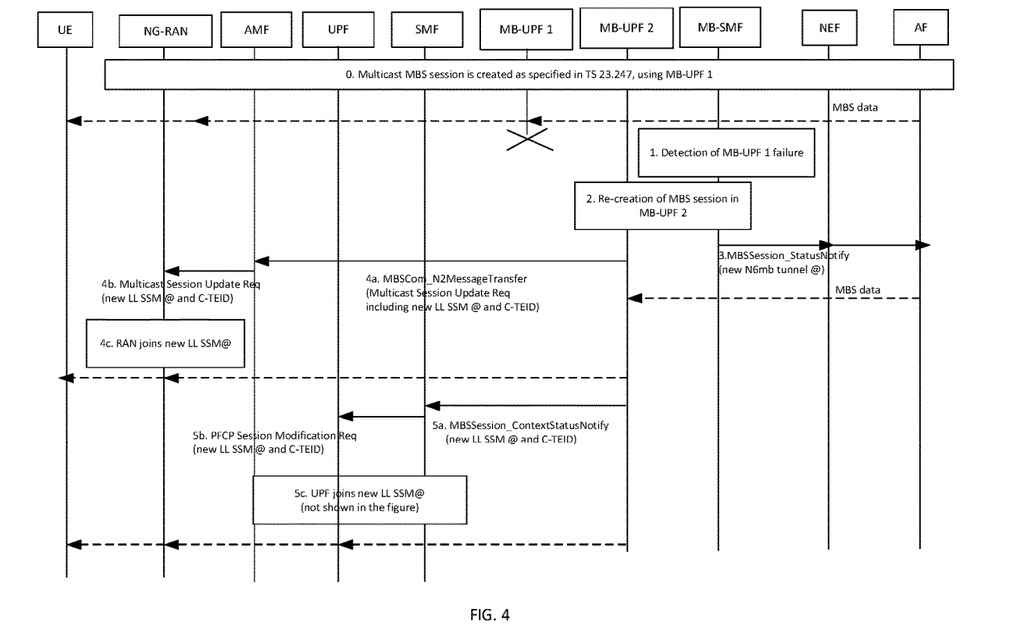
FIG. 4 illustrates a signal flow diagram of a method to restore a multicast multicast/broadcast service session upon failure of a multicast/broadcast user plane function without restart, according to certain embodiments.

FIG. 4 illustrates a signal flow diagram of a method to restore a multicast multicast/broadcast service session upon failure of a multicast/broadcast user plane function without restart, according to certain embodiments.

At 0, a multicast MBS session can be created, as described at 3GPP TS 23.247, using MB-UPF 1. As in the previous example, only two MB-UPFs are shown, but more could be present in the network.

MB-UPF 1 may fail. Then, at 1, the MB-SMF can detect MB-UPF failure without restart, or MB-UPF shutdown. For example, the MB-UPF may no longer be responsive and may cease replying to PFCP heartbeat messages.

At 2, the MB-SMF can re-creates the MBS session in MB-UPF 2. More particularly, the MB-SMF can reselect a different MB-UPF and can re-create the MBS session in this MB-UPF, including the GTP-U F-TEID of the current UPFs and RAN nodes involved in the delivery if unicast transport is used is used over over N3mb or N19mb towards those nodes. The MB-SMF can also indicate whether unicast or multicast transport is to be used to receive the MBS data over N6mb or Nmb9. If unicast transport is used, the MB-SMF can request the MB-UPF to allocate an (N6mb/N9mb) ingress tunnel address. If multicast transport is used the MB-SMF can provide a multicast address and can instruct the MB-UPF to join delivery from that multicast address.

The MB-UPF can return to the MB-SMF a new (N6mb/N9mb) ingress tunnel address to be used by the AF/NEF/MBSF to send MBS data if unicast transport is used over N6mb. As another option, the MB-UPF can return to the MB-SMF a new LL SSM address and C-TEID used by the MB-UPF to send MBS data towards RANs, if multicast transport is used over N3mb.

The MB-SMF can update the AF/NEF/MBSF about the new N6mb/Nmb9 tunnel address to use for sending MBS data. This can be done at 3 by the MB-SMF sending a Nmbsmf_MBSSession_StatusNotify request with a new event type reporting a change of the N6mb address and including the new address. The NEF forwards the notification using the Nnef_MBSSession_StatusNotify request with the same information.

The AF/MBSF can start sending MBS data to the new N6mb/Nmb9 tunnel address.

Meanwhile, the MB-SMF can update the RANs about the new MB-UPF LL SSM address and C-TEID, if multicast transport is used over N3mb, by sending an Namf_MBSCommunication_N2MessageTransfer Request at 4 encapsulating a NGAP Multicast Session Update Request message. The encapsulated message can have an embedded Multicast Session Update Request Transfer IE including the new LL SMM address and C-TEID used for the delivery of the MBS data, and can be forwarded by the AMF at 4b.

At 4c, the RANs can join the new multicast transport address to receive MBS data from the new MB-UPF and can leave the previous multicast address if the previous multicast address was in use for this broadcast/multicast session. The MBS session data can be sent to the multicast group members.

The MB-SMF can update the SMF about the new MB-UPF LL SSM address and C-TEID, if multicast transport is used over N19mb, by at 5a sending an Nmbsmf_ContextStatusNotify Request with a new event type reporting a change of the LL SMM address and C-TEID used for the delivery of the MBS data and including the new LL SSM address and C-TEID.

The SMF can update the UPF terminating the N19mb tunnel about the new MB-UPF LL SSM address and C-TEID. For example, at 5b, the SMF can send a PFCP session modification request using the LL SMM address and C-TEID.

At 5c, the UPF can join the new multicast address to receive MBS data from the new MB-UPF and can leave the previous multicast address. The MBS session data can be sent to the PDU sessions of the multicast group members associated with the MBS session, for example using 5GC Individual MBS traffic delivery).

The same approach described above can also apply to an MB-UPF failure with restart, if the MB-UPF does not support restoring the MBS session with the same N6mb and/or N3mb/N19mb LL SSL and C-TEID as were allocated before the restart. In other words, the approach described above may support all scenarios where the addressing information for MBS data delivery cannot be preserved in the MB-UPF and new addresses need to be allocated and used in the system.

Figure 5:
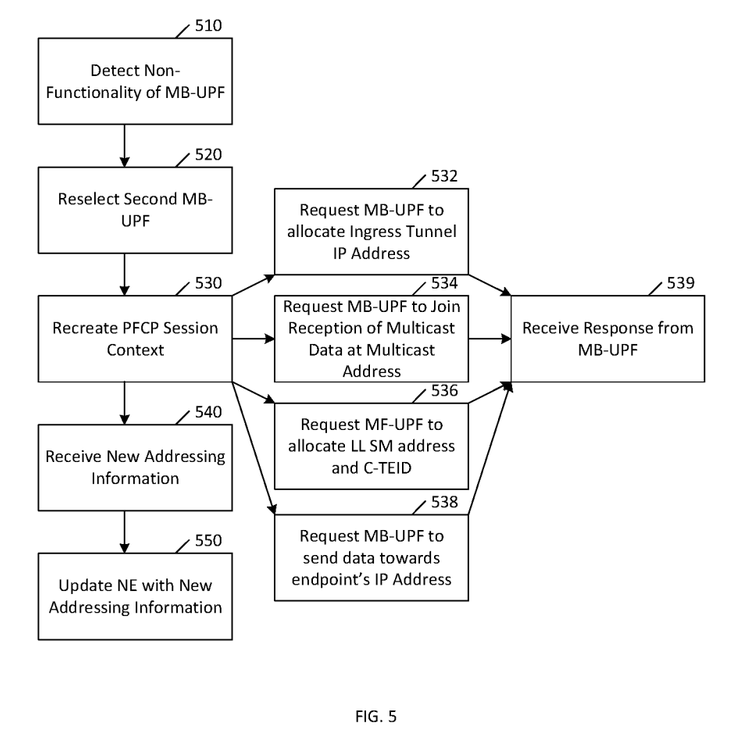
FIG. 5 illustrates a method according to certain embodiments.

FIG. 5 illustrates a method according to certain embodiments. As shown in FIG. 5, a method can include, at 510, detecting non-functionality of a first multicast/broadcast user plane function that was supporting a packet forwarding control protocol session context for a multicast/broadcast session. The method can also include, at 520, reselecting a second multicast/broadcast user plane function. The method can further include, at 530, recreating a packet forwarding control protocol session context in the second multicast/broadcast user plane function for said multicast/broadcast session. The method can additionally include, at 540, receiving new addressing information for the delivery of said multicast/broadcast session data from said second multicast/broadcast user plane function. The method can also include at 550, updating a network element with the new addressing information.

The detecting the non-functionality at 510 can include detecting that the first multicast/broadcast user plane function failed without restarting or detecting that the first multicast/broadcast user plane function shut down.

The recreating, at 530, a packet forwarding control protocol session context can include at least one of, at 532, requesting the second multicast/broadcast user plane function to allocate an ingress tunnel internet protocol address, if internet protocol unicast transport shall be used by the multicast/broadcast user plane function to receive the multicast/broadcast session data; at 534, requesting the second multicast/broadcast user plane function to join reception of multicast data at a multicast address provided by a multicast/broadcast session management function, if internet protocol multicast transport shall be used by the multicast/broadcast user plane function to receive the multicast/broadcast session data; at 536, requesting the second multicast/broadcast user plane function to allocate a low-layer source-specific multicast address and a common general packet radio service tunneling endpoint identifier, if internet protocol multicast transport shall be used by the second multicast/broadcast user plane function to send the multicast/broadcast session data; or, at 538, for each endpoint to receive multicast data, requesting the second multicast/broadcast user plane function to send data toward the unicast destination address and general packet radio service tunneling endpoint identifier address provided by the multicast/broadcast session management function, if internet protocol unicast transport shall be used towards the endpoint.

The method can also include, at 539, receiving a response from the second multicast/broadcast user plane function. The response can include at least one of: the low-layer source-specific multicast address and the common general packet radio service tunneling endpoint identifier, or the ingress tunnel internet protocol address.

The updating a network element at 550 can include at least one of the following: updating an application function, or a network exposure function, or a multicast/broadcast service function with the ingress tunnel internet protocol address received from the second multicast/broadcast user plane function; updating an access management function, or a radio access node with the low-layer source-specific multicast address and the common general packet radio service tunneling endpoint identifier received from the second multicast/broadcast user plane function; or updating a service management function with the low-layer source-specific multicast address and the common general packet radio service tunneling endpoint identifier received from the second multicast/broadcast user plane function.

Updating an application function, a network exposure function, or a multicast/broadcast service function can include sending a multicast/broadcast session status notification request reporting an ingress tunnel address change event and the updated ingress tunnel internet protocol address.

Updating an access management function, or a radio access node, can include at least one of the following: sending a multicast session update request for a multicast session including the low-layer source-specific multicast address and the common general packet radio service tunneling endpoint identifier; or sending a broadcast session modification request for a broadcast session including the low-layer source-specific multicast address and the common general packet radio service tunneling endpoint identifier.

Updating a session management function can include at least one of the following: sending a multicast/broadcast session context status notification for a multicast session reporting a change a low-layer source-specific multicast address change and including the updated low-layer source-specific multicast address and the common general packet radio service tunneling endpoint identifier.

Figure 6:
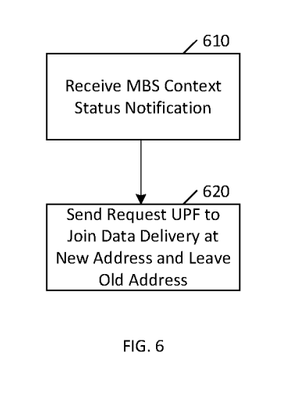
FIG. 6 illustrates a further method according to certain embodiments.

FIG. 6 illustrates a further method according to certain embodiments. As shown in FIG. 6, a method can include, at 610, receiving a multicast/broadcast session context status notification for a multicast session reporting a change a low-layer source-specific multicast address change and including the updated low-layer source-specific multicast address and the common general packet radio service tunneling endpoint identifier. The method can also include, at 620, sending a request to a user plane function for the multicast session to join data delivery of the low-layer source-specific multicast address and the common general packet radio service tunneling endpoint identifier and leave the data delivery from the low-layer source-specific multicast address that was previously in use for the multicast session.

Figure 7:
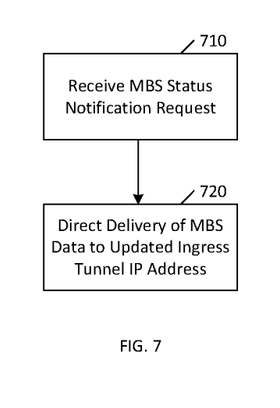
FIG. 7 illustrates another method according to certain embodiments.

FIG. 7 illustrates another method according to certain embodiments. As shown in FIG. 7, the method can include, at 710, receiving a multicast/broadcast session status notification request reporting an ingress tunnel address change event and including an updated ingress tunnel internet protocol address. The method can also include, at 720, redirecting the delivery of the multicast/broadcast session data to the updated ingress tunnel internet protocol address.

Figure 8:
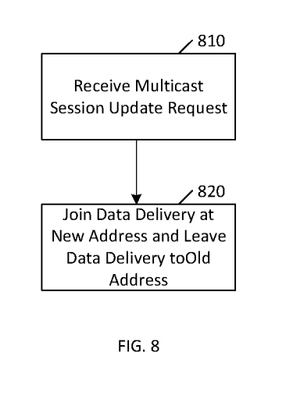
FIG. 8 illustrates an additional method according to certain embodiments.

FIG. 8 illustrates an additional method according to certain embodiments. As shown in FIG. 8, the method can include, at 810, receiving a multicast session update request for a multicast session including an updated low-layer source-specific multicast address and common general packet radio service tunneling endpoint identifier. The method can also include, at 820, joining the delivery of the multicast session data from the updated low-layer source-specific multicast address and common general packet radio service tunneling endpoint identifier, and leaving data delivery from the previous low-layer source-specific multicast address and common general packet radio service tunneling endpoint identifier that was in use for the multicast session.

Figure 9:
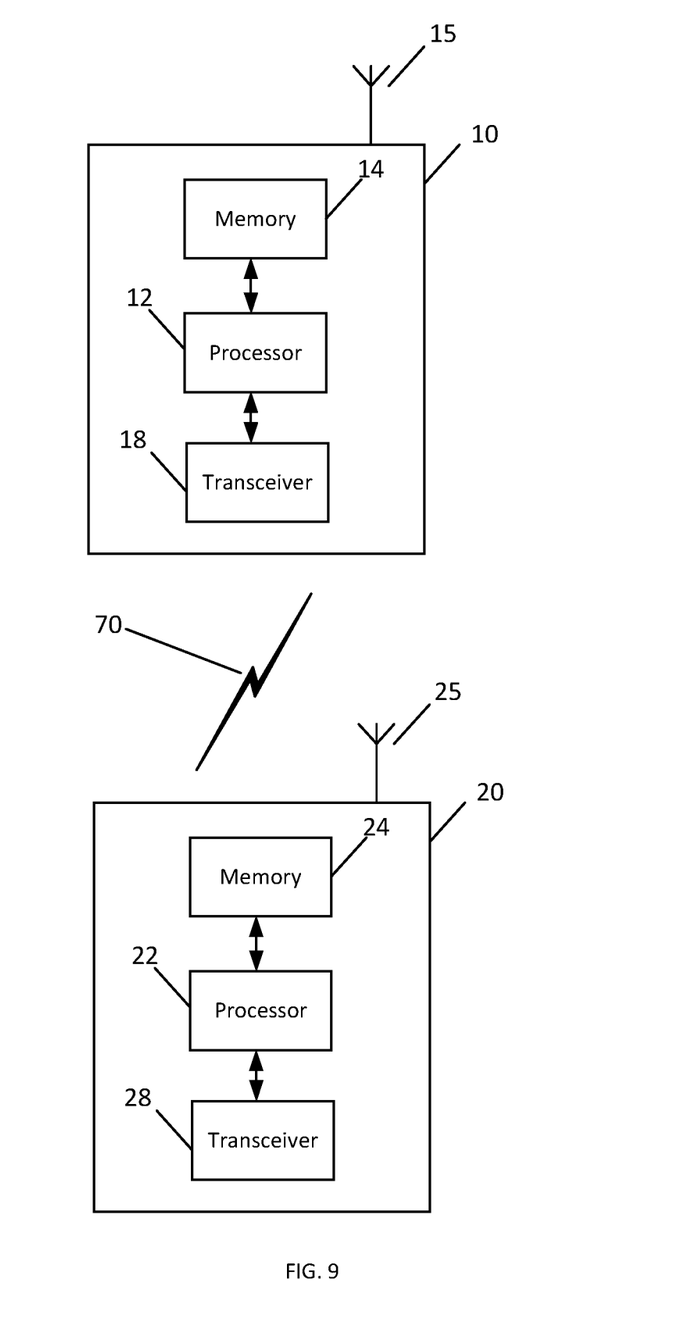
FIG. 9 illustrates an example block diagram of a system, according to an embodiment.

FIG. 9 illustrates an example of a system that includes an apparatus 10, according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), TRP, HAPS, integrated access and backhaul (IAB) node, and/or a WLAN access point, associated with a radio access network, such as a LTE network, 5G or NR. In some example embodiments, apparatus 10 may be gNB or other similar radio node, for instance.

It should be understood that, in some example embodiments, apparatus 10 may comprise an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a mid-haul interface, referred to as an F1 interface, and the DU(s) may have one or more radio unit (RU) connected with the DU(s) over a front-haul interface. The DU may be a logical node that includes a subset of the gNB functions, depending on the functional split option. It should be noted that one of ordinary skill in the art would understand that apparatus 10 may include components or features not shown in FIG. 9.

As illustrated in the example of FIG. 9, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples. While a single processor 12 is shown in FIG. 9, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RANI), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15, or may include any other appropriate transceiving means. The radio interfaces may correspond to a plurality of radio access technologies including one or more of global system for mobile communications (GSM), narrow band Internet of Things (NB-IoT), LTE, 5G, WLAN, Bluetooth (BT), Bluetooth Low Energy (BT-LE), near-field communication (NFC), radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (via an uplink, for example).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry/means or control circuitry/means. In addition, in some embodiments, transceiver 18 may be included in or may form a part of transceiver circuitry/means.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be or may be a part of a network element or RAN node, such as a base station, access point, Node B, eNB, gNB, TRP, HAPS, IAB node, relay node, WLAN access point, satellite, or the like. In one example embodiment, apparatus 10 may be a gNB or other radio node, or may be a CU and/or DU of a gNB. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as those illustrated in FIGS. 2-8, or any other method described herein. In some embodiments, as discussed herein, apparatus 10 may be configured to perform a procedure relating to providing restoration of multicast/broadcast service upon multicast/broadcast user plane function failure without restart, for example.

FIG. 9 further illustrates an example of an apparatus 20, according to an embodiment. In an embodiment, apparatus 20 may be a node or element in a communications network or associated with such a network, such as a UE, communication node, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 9.

As illustrated in the example of FIG. 9, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 9, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, SL UE, relay UE, mobile device, mobile station, ME, IoT device and/or NB-IoT device, or the like, for example. According to certain embodiments, apparatus 20 may be controlled by memory 24 and processor 22 to perform the functions associated with any of the embodiments described herein, such as one or more of the operations illustrated in, or described with respect to, FIGS. 2-8, or any other method described herein. For example, in an embodiment, apparatus 20 may be controlled to perform a process relating to providing restoration of multicast/broadcast service upon multicast/broadcast user plane function failure without restart, as described in detail elsewhere herein.

In some embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of any of the operations discussed herein.

In view of the foregoing, certain example embodiments provide several technological improvements, enhancements, and/or advantages over existing technological processes and constitute an improvement at least to the technological field of wireless network control and/or management. Certain embodiments may have various benefits and/or advantages. For example, certain embodiments may support all scenarios where the addressing information for MBS data delivery cannot be preserved in the MB-UPF and new addresses need to be allocated and used in the system.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single network node may also apply to example embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

We claim:

1. An apparatus, comprising:
at least one processor; and
at least one memory comprising computer program instructions,
wherein the at least one memory and the computer program instructions are configured to, with the at least one processor, cause the apparatus at least to perform:
detecting non-functionality of a first multicast/broadcast user plane function that was supporting a packet forwarding control protocol session context for a multicast/broadcast session;
reselecting a second multicast/broadcast user plane function;
recreating a packet forwarding control protocol session context in the second multicast/broadcast user plane function for said multicast/broadcast session;
receiving new addressing information for the delivery of said multicast/broadcast session data from said second multicast/broadcast user plane function; and
updating a network element with the new addressing information, wherein updating a network element comprises at least one of updating an application function, or a network exposure function, or a multicast/broadcast service function with an ingress tunnel internet protocol address received from the second multicast/broadcast user plane function.

2. The apparatus of claim 1, wherein the detecting the non-functionality comprises detecting that the first multicast/broadcast user plane function failed without restarting or detecting that the first multicast/broadcast user plane function shut down.

3. The apparatus of claim 1, wherein the recreating a packet forwarding control protocol session context comprises at least one of:
requesting the second multicast/broadcast user plane function to allocate the ingress tunnel internet protocol address, if internet protocol unicast transport shall be used by the multicast/broadcast user plane function to receive the multicast/broadcast session data;
requesting the second multicast/broadcast user plane function to join reception of multicast data at a multicast address provided by the apparatus, if internet protocol multicast transport shall be used by the multicast/broadcast user plane function to receive the multicast/broadcast session data;
requesting the second multicast/broadcast user plane function to allocate a low-layer source-specific multicast address and a common general packet radio service tunneling endpoint identifier, if internet protocol multicast transport shall be used by the second multicast/broadcast user plane function to send the multicast/broadcast session data; or
for each endpoint to receive multicast/broadcast session data, requesting the second multicast/broadcast user plane function to send data toward the unicast destination address and general packet radio service tunneling endpoint identifier address provided by the apparatus, if internet protocol unicast transport shall be used towards the endpoint.

4. The apparatus of claim 3, wherein the at least one memory and the computer program instructions are configured to, with the at least one processor, cause the apparatus at least to perform:
receiving a response from the second multicast/broadcast user plane function, the response comprising at least one of: the low-layer source-specific multicast address and the common general packet radio service tunneling endpoint identifier, or the ingress tunnel internet protocol address.

5. The apparatus of claim 3, wherein updating a network element further comprises at least one of:

updating an access management function, or a radio access node with the low-layer source-specific multicast address and the common general packet radio service tunneling endpoint identifier received from the second multicast/broadcast user plane function; or updating a service management function with the low-layer source-specific multicast address and the common general packet radio service tunneling endpoint identifier received from the second multicast/broadcast user plane function.

6. The apparatus of claim 5, wherein updating an application function, a network exposure function, or a multicast/broadcast service function comprises:

sending a multicast/broadcast session status notification request reporting an ingress tunnel address change event and the updated ingress tunnel internet protocol address.

7. The apparatus of claim 5, wherein updating an access management function, or a radio access node, comprises at least one of:

sending a multicast session update request for a multicast session including the low-layer source-specific multicast address and the common general packet radio service tunneling endpoint identifier; or sending a broadcast session modification request for a broadcast session including the low-layer source-specific multicast address and the common general packet radio service tunneling endpoint identifier.

8. The apparatus of claim 1, wherein updating a session management function comprises at least one of:

sending a multicast/broadcast session context status notification for a multicast session reporting a low-layer source-specific multicast address change and including the updated low-layer source-specific multicast address an=d the common general packet radio service tunneling endpoint identifier.

9. An apparatus, comprising:

at least one processor; and at least one memory comprising computer program instructions, wherein the at least one memory and the computer program instructions are configured to, with the at least one processor, cause the apparatus at least to perform:

receiving a multicast/broadcast session context status notification for a multicast session reporting a low-layer source-specific multicast address change and including the updated low-layer source-specific multicast address and the common general packet radio service tunneling endpoint identifier; and sending a request to a user plane function for the multicast session configured to terminate an N19mb tunnel to join data delivery of the low-layer source-specific multicast address and the common general packet radio service tunneling endpoint identifier and leave the data delivery from the low-layer source-specific multicast address that was previously in use for the multicast session.

10. An apparatus, comprising:

at least one processor; and at least one memory comprising computer program instructions, wherein the at least one memory and the computer program instructions are configured to, with the at least one processor, cause the apparatus at least to perform:

receiving a multicast session update request for a multicast session configured to terminate an N19mb tunnel including an updated low-layer source-specific multicast address and common general packet radio service tunneling endpoint identifier; and joining the delivery of the multicast session data from the updated low-layer source-specific multicast address and common general packet radio service tunneling endpoint identifier, and leaving data delivery from the previous low-layer source-specific multicast address and common general packet radio service tunneling endpoint identifier that was in use for the multicast session.

* * * * *